MAGNETIC PROGRAMMING SWITCHES

Filed April 12, 1968

INVENTOR

Bernard Edward Shlesinger Jr.

INVENTOR

Bernard Edward Shlesinger Jr.

INVENTOR

Bernard Edward Shlesinger Jr

United States Patent Office 3,447,109

Patented May 27, 1969

3,447,109

MAGNETIC PROGRAMMING SWITCHES

Bernard Edward Shlesinger, Jr., 3906 Bruce Lane, Annandale, Va. 22003

Filed Apr. 12, 1968, Ser. No. 720,899
Int. Cl. H01h 9/02, 9/54
U.S. Cl. 335—205 38 Claims

ABSTRACT OF THE DISCLOSURE

A magnetic programming switch for electrical circuitry comprising a housing; a series of magnetic devices mounted in the wall of said housing; a flexible, resilient, expandable and contractable member in wiping engagement with or close proximity to an inside wall of said housing; said member including at least one magnetic material element carried thereby; and means for contracting and expanding said member whereby movement of said member from one position to another moves said element from one position to another thereby to cause changes in operation of the electrical circuitry.

HISTORY AND DEVELOPMENT

This invention relates to improvements in multiple type programming switches. In the past, electromechanical switching was done in multiple type programming devices by means of contact connection. More recent development has been to utilize magnetic systems for the purpose of programming such as disclosed in my Patent 3,261,941 issued July 19, 1966. This invention is analogous to the devices shown in my patents, 1,874,237, issued Feb. 17, 1959; 3,027,435, issued Mar. 27, 1962; 3,047,683, issued July 31, 1962; 3,138,672, issued June 23, 1964; 3,166,645, issued Jan. 19, 1965; and 3,261,932, issued July 19, 1966. Where electrical connectors were used in operating the programming switches set out in most of the aforementioned patents, this invention contemplates the utilization of magnetic means to cause a switching or programming of an electrical circuit. The use of the words "switch" or "switching" is intended to refer not only to the operation of contact switches by magnetic means, but also, the influencing of or actuation of an electrical circuit by means of a metallic or magnetic device which effects or influences a sensor.

OBJECTS AND SUMMARY

It is an object of this invention to provide a programming switch system which has unlimited flexibility as to combinations and programs.

It is a further object of this invention to provide a programming switch system which is compact and readily assembled.

It is another object of this invention to provide a programming switch which may be sealed and kept free from dust and moisture.

A further object of this invention is to provide a programming switch which may operate on several different circuits simultaneously each independently of the other.

Yet a further object of this invention is to provide a programming switch which may be pre-programmed for a specific job and which may be selectively changed to provide another programming job without replacing the entire unit.

Yet a further object of this invention is to provide a programming switch which is operable by any desirable type of motor mechanism.

In summary, this invention deals with the utilization of a moving member which is capable of being compressed, distorted or expanded and which member is resilient and flexible and carries magnetic means either capable of being magnetized or small permanent magnets which when brought into close proximity to sensors or reed switches or other type of magnetically operable switches, will cause switching or influencing of certain circuits in preselected sequence depending upon the manner in which the magnetic material elements are placed in the carrier or movable structure and the time in which the material is moved in a housing in which the magnetic devices are or the manner in which the housing walls are moved toward or away from each other thereby to exert a force on the carrier.

These and other objects of this invention will be apparent from the following description and claims:

In the accompanying drawings which illustrate by way of example various embodiments of this invention:

FIGURES 9 and 10 are cross sectional views of still a further embodiment of this invention in which FIGURE 9 shows the resilient member at rest and FIGURE 10 shows the resilient member in expanded position;

*FIGURE 1*

Figure 1:
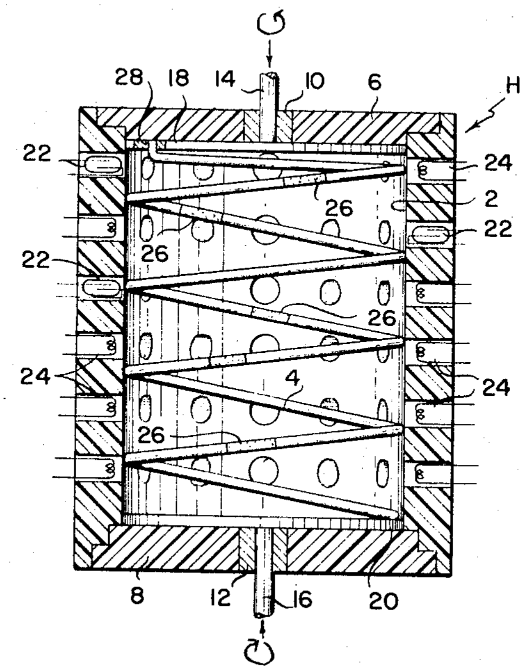
FIGURE 1 is a cross sectional view of the invention utilizing a helix as the expanding and contracting member.

In FIGURE 1, the housing H includes an annular chamber 2 having mounted therein for compression and expansion a coil 4. A top cover member 6 and a bottom cover member 8 are threaded or otherwise positioned in the housing H. Bearings 10 and 12 are provided in the cover members for receiving rods 14 and 16 of the pistons 18 and 20. The pistons 18 and 20 are movable both in a vertical direction and in a rotary direction as will hereinafter be explained.

Mounted in the walls of the housing are reed switches 22 and detectors or sensors 24.

The coil 4 is provided with magnetic material members or elements 26. The devices 22 and 24 are such as will be influenced by a magnetic material element 26 which may be a permanent magnet or a ferro-magnetic material or the like. The coil 4 may be a plastic material which has been molded with the elements 26 positioned therein or the elements 26 may be included or otherwise carried by the coil 4. They may be small slidable magnets or the like which may be moved to various positions on the coil as desired for certain select programming operations. The housing H may be provided with a number of openings which may receive plugs which may be readily removed for positioning of the switch or sensor devices 22 and 24 as desired for various programming arrangements.

*Operation*

It will now be apparent that the operation of this device will be similar to the operation illustrated in my patents 2,874,237, and 3,138,672. By rotating the coil 4 within the housing H, the elements 26 will be moved from one position to another thereby influencing devices 22 and 24. The rotation may be for a given period of time in order to have sequential operation or it may be merely for the purpose of selecting a new switching arrangement. It will also be obvious that by shifting the pistons 18 and 20, the coil will be compressed therefore presenting a different combination of devices 22 and 24. Compression of either the top piston 18 or the bottom piston 20 allows for variation in programming. Rotating the pistons can be done while the coil is under compression which further permits variations in the programming. Furthermore the rotation and compression may take place in a timed sequence by use of obvious motor means such as gearing and cam arrangements (not shown). It will be obvious that intermediate plates or a multiple number of coils can be utilized in the same manner as illustrated in my Patent 3,138,672. The shifting of members 26 will as aforementioned permit further variation in the programming arrangement. Removal of one of the cover members 6 or 8 will permit the coil to be removed for changing of the positions of the elements 26. It will be noted that the element 4 is fixed at one end to a piston member. The other end is free to rotate to thus prevent windup of the coil should either the top or the bottom piston members 18 or 20 respectively be rotated individually. Instead of a direct connection as at 28, the bottom portion of the pistons 18 and 20 may have frictional surfaces for preventing slippage of the coil 4 during rotation thereof by the pistons 18 and 20. It will be obvious that the reed switch devices 22 or detector devices 24 will be connected to various electrical components (not shown) for programmed operation thereof.

*FIGURES 2 THROUGH 7*

In FIGURES 2 through 7, the housing H and the annular chamber 2 have positioned therein an annular resilient expandable and contractable elastic member 30 which is of block form. The resilient block member 30 has embedded therein a number of magnets or magnetic material members or elements 32. The elements 32 may be permanent magnets, or magnetic material. If the elements are permanent magnets, the poles may be oriented in various directions as desired for achieving different effects particularly where the reed switches include a specific magnetic polarity. This means that the reed switches will remain open or closed depending upon the orientation of the pole of the permanent magnets 32. Reed switches having a specific polarity are readily available on the market. Thus if the pole of the reed switch is similar to the pole presented by the magnet when positioned adjacent the reed switch, there will be a repelling force applied whereas an attracting force will be applied when dissimilar poles are presented towards each other. This selection of the positioning of the direction of the poles of the magnets within the block 30 permits considerable variations in programming. It will be obvious that various blocks may be used depending upon the programming desired and one of the cover members 6 and 8 removed for insertion of a different block 30.

*Operation*

Figure 3:
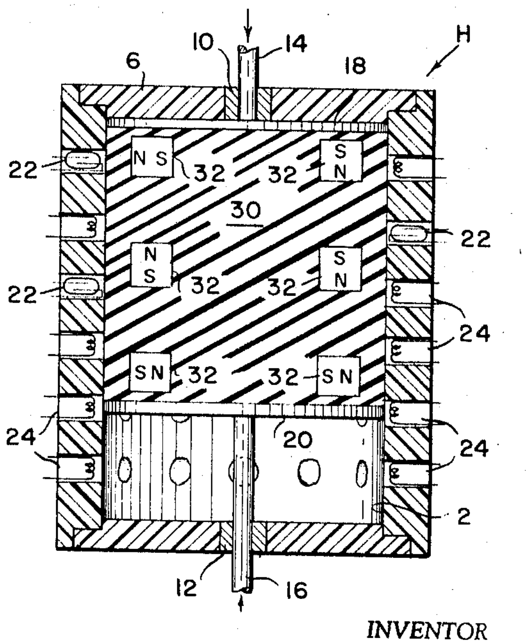
FIGURE 3 is a cross sectional view showing the embodiment illustrated in FIGURE 2 when under compression by the bottom piston member.
Figure 2:
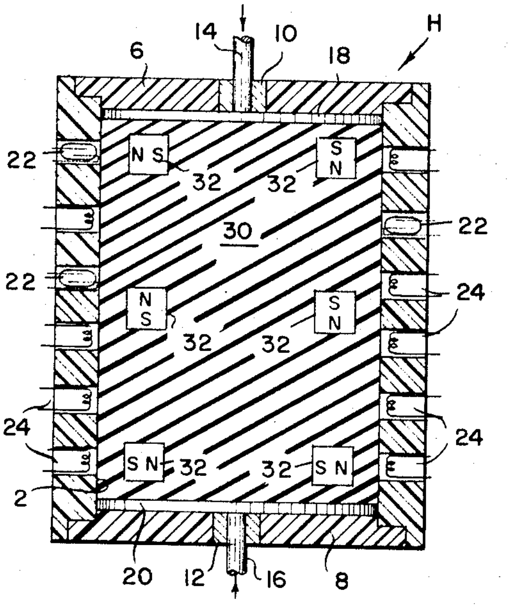
FIGURE 2 is a cross sectional view illustrating another embodiment of this invention.
Figures 4, 5, 7:
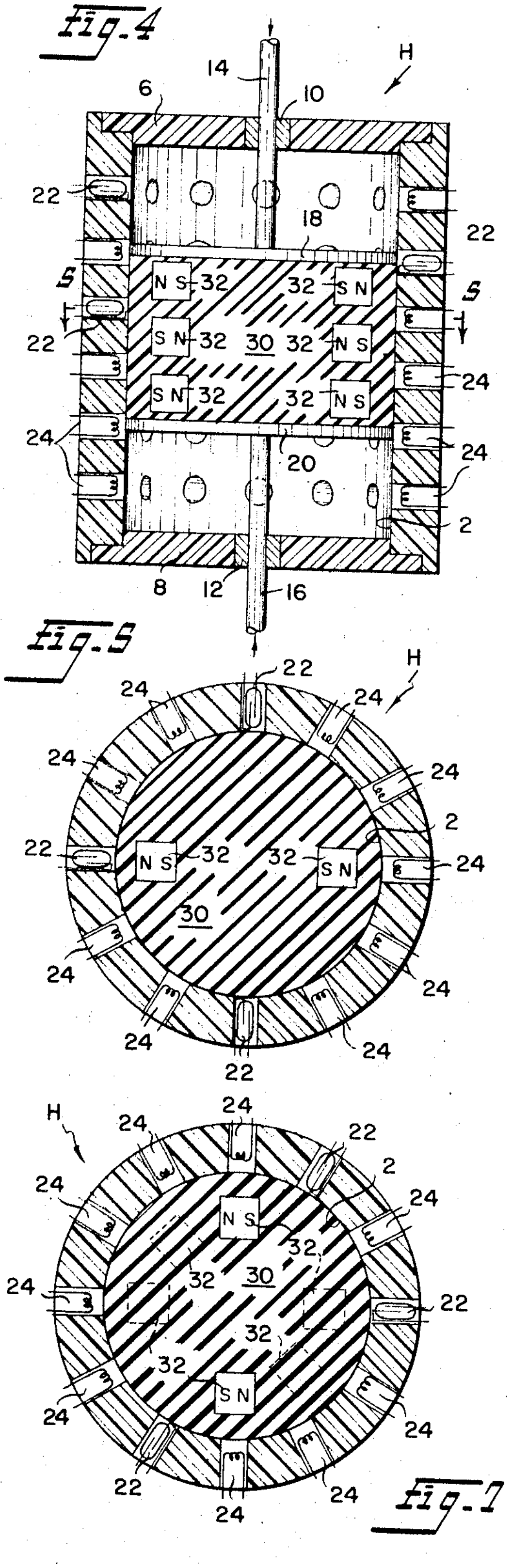
FIGURE 4 is a cross sectional view illustrating the embodiment shown in FIGURE 2 with both the upper and lower pistons moved to apply compression.
FIGURE 5 is a cross sectional view taken along the lines 5—5 in FIGURE 4 and viewed in the direction of the arrows.
FIGURE 7 is a cross sectional view taken along the lines 7—7 in FIGURE 6 and viewed in the direction of the arrows.
Figure 6:
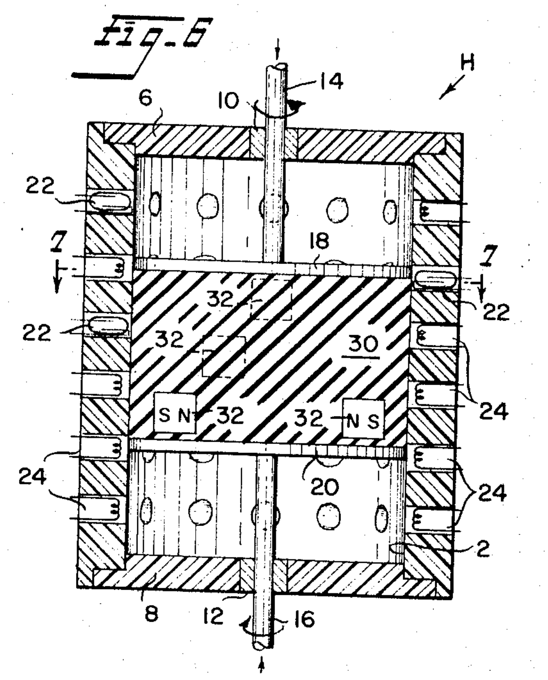
FIGURE 6 is a cross sectional view of the embodiment illustrated in FIGURE 2 showing the device under compression by both the upper and lower pistons and one of the pistons rotated a degree different from the other piston so as to put a twist in the magnetic material carrying member.

The operation will now be apparent from a study of FIGURES 3 through 7. FIGURE 3 illustrates compression in a vertical upward direction whereas FIGURE 4 illustrates compression of an upward and downward direction. FIGURE 6 illustrates both compression and rotation with the rotation of the piston 18 being in one direction and the piston 20 being in the reverse direction so as to have a twisting of the block member 30. It will thus be obvious that the block member may be secured to both pistons 18 and 20 by adhesive or some other means to permit this twisting action. The twisting action permits additional programming arrangements. FIGURES 5 and 7 more clearly illustrate the difference between a compression with no twisting action and a compression with twisting action showing the displacement of certain of the elements 32 from one another.

As in FIGURE 1, variations can be obtained by inserting devices 22 and 24 into various locations in the housing H. A study of my Patent 3,047,683 will illustrate in greater detail the broad principles of the invention.

*FIGURE 8*

Figure 8:
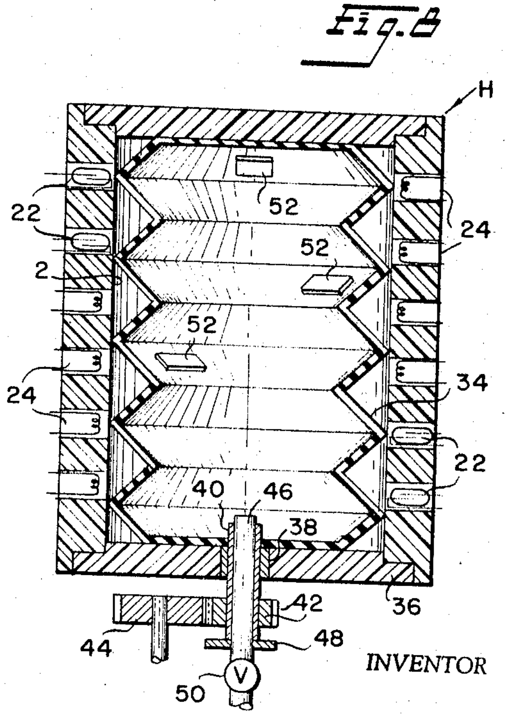
FIGURE 8 is a cross sectional view illustrating yet another embodiment of the invention in which the expanding and contracting member is a bellows.

FIGURE 8 is somewhat similar to the devices illustrated in my Patent 3,027,435. In FIGURE 8, the housing H is provided with a bellows or balloon member 34. The bottom cover member 36 is provided with a bearing sleeve 38 into which is mounted a rotating sleeve 40 to which is splined a gear 42 which is driven by a pinion gear 44. Within the rotating sleeve 40 is a stationary pressure tube 46 having a support washer member 48 for support of the rotating sleeve 40. A valve *t0* is provided for the pressure tube 46. The bellows or balloon member 34 is secured to the rotating sleeve 40 and rotates with the sleeve 40 when it is rotated by the pinion gear 44 by motor means (not shown). Secured or otherwise mounted in or on the bellows or balloon 34 are a series of magnetic material elements 52. The elements may be oriented in various directions for purposes aforementioned.

*Operation*

In operation, the bellows 34 or the balloon as the case case may be is inflated or evacuated by means of a pump (not shown) or like device. Air or other gas is either drawn from or put into the bellows or balloon 34. Increasing or decreasing the pressure within the member 34 causes the member to move up and down within the housing H and the magnetic elements 52 to move up or down with respect to the devices 22 and 24 mounted in the walls of the housing H. Atmospheric pressure may be the controlling factor for expanding or contracting the member 34. Rotation of the member 34 will change the electrical switching operation in the manner heretofore described.

*FIGURES 9 AND 10*

Figure 9:
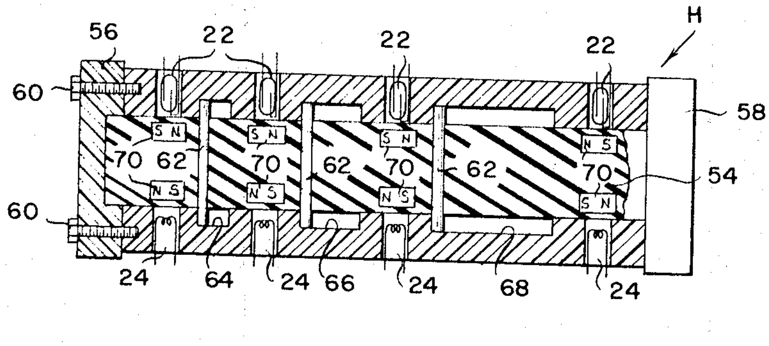
Figure 10:
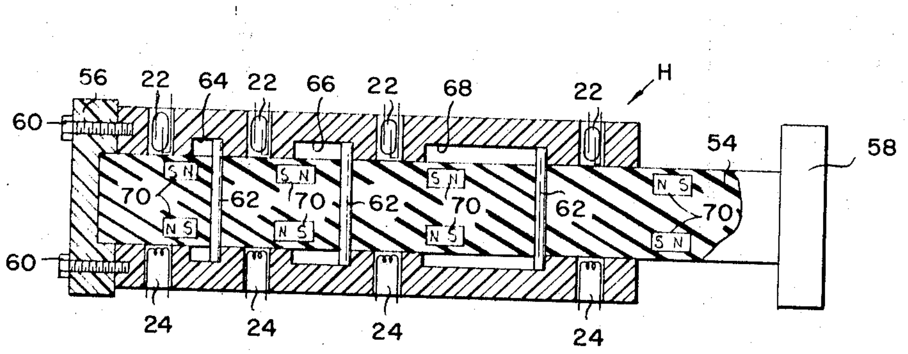

The invention illustrated in FIGURES 9 and 10 is somewhat similar to my Patent 3,166,645. The housing H which includes various reed switches 22 and detectors 24 has mounted therein an elastic member 54 provided with a holding plate 56 and a pull plate 58. The holding plate 56 is secured by bolts 60 or the like to one end of the housing H. Mounted in the elastic expandable and contractable member 54 are a series of pins 62. The pins 62 extend into slots 64, 66 and 68. The slots are progressively longer from left to right as viewed in FIGURES 9 and 10. Mounted in the elastic member 54 are a series of magnetic material elements 70.

*Operation*

It will now be obvious that when the elastic member 54 is stretched by pulling on the pull plate 58, the pins 62 will gradually move to the right from the position shown in FIGURE 9 to the position shown in FIGURE 10 in stepped increments beginning with slot 64 and subsequently to slot 66 and 68 because of the additional length of the slots. Once the pin 62 comes to the end of its respective slot, the elastic member will continue stretching only from that point on. Thus there will be a sequence step-by-step positioning of the elements 70. In this way there will be a series operation and depending upon the positioning of the elements 70 and the devices 22 and 24, there will be a sequence operation of switching. Releasing the pull plate 58 will allow the reverse order of operation in that the operation will be sequential from right to left as viewed in the figures. It will be obvious that many arrangements of this can be worked out in a manner similar to those described in my Patent 3,166,645.

*FIGURES 11 AND 12*

In FIGURE H, the housing H is provided with reed switches 22 and 24 in the walls thereof. A push button 72 operates a pressure plate 74. The pressure plate 74 is biased in an upwardly direction by a U-shaped resilient member 76. The legs of the U-shaped member 76 when the plate is in raised position are close together whereas they are spread apart when the push button 72 depresses pressure plate 74. Mounted to or otherwise secured in the legs 76 are magnetic material elements 78. A recess 80 in the pressure plate 74 centers the U-shaped member 76.

Figure 12:
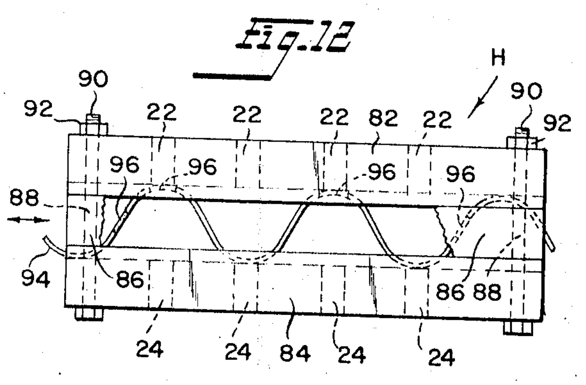
FIGURE 12 is a cross sectional view of yet another embodiment of this invention showing the expandable and contractable member having a sinusoidal configuration.

In FIGURE 12, the housing H is provided with a movable pressure plate 82 and a stationary pressure plate 84 though both plates may actually be movable as desired. The pressure plates 82 and 84 of the housing H are spaced from each other by resilient side wall means 86. Means such as pins 88 are provided with threaded ends 90 to which are threaded adjustment nuts 92. Passing into the housing H and extending out therefrom is a sinusoidal member 94 having magnetic material elements 96. Motor means (not shown) is provided for moving the sinusoidal member 94 through the housing H.

*Operation*

Figure 11:
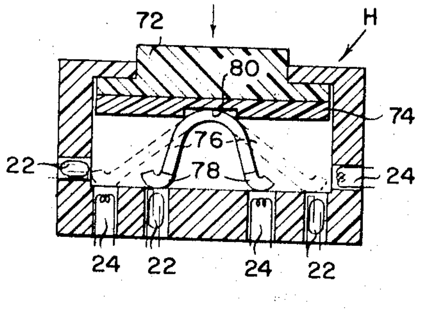
FIGURE 11 is a cross sectional view illustrating yet another embodiment of this invention in which the expanding and contracting member is U-shaped.

The operation of the devices illustrated in FIGURES 11 and 12 is similar in manner to that in my Patent 3,261,932. In FIGURE 11, the legs of the U-shaped member 76 move away from each other upon depression of the push button so as to affect a change in the switching devices 22 and 24. Similarly, in FIGURE 12, the sinusoidal member 94 will have an alteration of its wave form upon adjustment of the nuts 92 to compress the sinusoidal member or to permit expansion of the sinusoidal member in the housing H. Positioning of the magnetic material elements in or on the sinusoidal member will permit change in programming sequence when the member is moved through the housing H. Various configurations of the sinusoidal member 94 may be provided in the same manner as illustrated in my Patent 3,261,932.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and fall within the scope of the invention or the limits of the appended claims.

Having thus described my invention, what I claim is:

1. A magnetic programming switch comprising:

(a) a housing, (b) a series of magnetically influenced devices mounted in the wall of said housing for connection to electrical circuitry, (c) a flexible, resilient, expandable and contractable member in wiping engagement with an inside wall of said housing, (d) said member including at least one magnet material element carried thereby, and (e) means for contracting and expanding said member whereby, when said devices are electrically connected, movement of said member from one position to another thereby to selectively operate certain of said electrical circuitry.

2. A magnetic programming switch as in claim 1 and wherein:

(a) said member includes a coil.

3. A magnetic programming switch as in claim 1 and wherein:

(a) said member includes a plurality of spaced magnet material elements.

4. A magnetic programming switch as in claim 1 and wherein:

(a) said magnet material element is a permanent magnet.

5. A magnetic programming switch as in claim 4 and wherein:

(a) said permanent magnet has its poles axially aligned with the longitudinal axis of said expandable and contractable member.

6. A magnetic programming switch as in claim 4 and wherein:

(a) said permanent magnet has its poles on an axis transverse to the longitudinal axis of said expandable and contractable member.

7. A magnetic programming switch as in claim 1 and wherein:

(a) said expandable and contractable member is plastic, and (b) said element carried thereby is ferromagnetic.

8. A magnetic programming switch as in claim 1 and wherein:

(a) said devices include ferromagnetic sensors.

9. A magnetic programming switch as in claim 1 and wherein:

(a) said devices include magnetically operable reed switches.

10. A magnetic programming switch as in claim 1 and wherein:

(a) said expandable and contractable member is rotatable, and said switch includes (b) means for rotating said member.

11. A magnetic programming switch as in claim 1 and wherein:

(a) said means for compressing includes at least two movable platens operating on different portions of said expandable and contractable member.

12. A magnetic programming switch as in claim 11 and wherein:

(a) said movable platens are in opposed relationship to each other.

13. A magnetic programming switch as in claim 1 and wherein:

(a) at least a portion of said inside wall is annular.

14. A magnetic programming switch as in claim 1 and wherein:

(a) said expandable and contractable member occupies the entire space of said housing when in maximum expanded position and only a portion of the entire space of said housing when in contracted position.

15. A magnetic programming switch as in claim 14 and wherein:

(a) said member includes a plurality of spaced magnetic material elements.

16. A magnetic programming switch as in claim 3 and wherein:

(a) said expandable and contractable member is twistable, and said switch includes (b) means for twisting said member.

17. A magnetic programming switch comprising:

(a) a housing, (b) a series of magnetically influenced devices mounted in the wall of said housing for connection to electrical circuitry, (c) a flexible, resilient, expandable, contractable and twistable member in wiping engagement with an inside wall of said housing, (d) said member including at least two magnetci material elements carried thereby, and (e) means for twisting said member, whereby, when said devices are electrically connected, movement of said member from one position to another moves said elements from one position to another thereby to selectively operate certain of said electrical circuitry.

18. A magnetic programming switch as in claim 17, and wherein:

(a) said member is rotatable, and includes (b) means for rotating said member.

19 A magnetic programming switch as in claim 18 and including:

(a) means for contracting and expanding said member linearly.

20. A magnetic programming switch as in claim 17 and wherein:

(a) said magnetic material elements are permanent magnets.

21. A magnetic programming switch as in claim 17 and wherein:

(a) at least two of said permanent magnets are arranged with the poles extending in different directions.

22. A magnetic programming switch as in claim 1 and wherein:

(a) said member is inflatable.

23. A magnetic programming switch as in claim 22 and wherein:

(a) said inflatable member is a bellows.

24. A magnetic programming switch as in claim 22 and wherein:

(a) said member is rotatable, and said switch includes (b) means for rotating said member.

25. A magnetic programming switch as in claim 22 and wherein:

(a) said magnetic material element is printed on said inflatable bellows.

26. A magnetic programming switch as in claim 3 and including:

(a) means for limiting the travel of certain elements while permitting the travel of others.

27. A magnetic programming switch as in claim 26 and wherein:

(a) said means for limiting the travel includes sequential stop means.

28. A magnetic programming switch as in claim 27 and wherein:

(a) said member is rotatable, and said switch includes (b) means for rotating said member.

29. A magnetic programming switch as in claim 26 and wherein:

(a) said member is twistable, and said switch includes (b) means for twisting said member.

30. A magnetic programming switch as in claim 1 and wherein:

(a) said member is strip material.

31. A magnetic programming switch as in claim 30 and wherein:

(a) said strip material is sinusoidal.

32. A magnetic programming switch as in claim 30 and wherein:

(a) said strip material is U-shaped.

33. A magnetic programming switch as in claim 3 and wherein:

(a) said strip material is U-shaped, and (b) each leg of said U includes at least one of said magnetic material elements.

34. A magnetic programming switch as in claim 33 and wherein:

(a) an inside wall of said housing is stationary.

35. A magnetic programming switch as in claim 33 and wherein:

(a) an inside wall of said housing is movable.

36. A magnetic programming switch as in claim 33 and wherein:

(a) said means for contracting and expanding includes an adjustable height platen member.

37. A magnetic programming switch as in claim 31 and wherein:

(a) said sinusoidal member is movable into, through and out of said housing.

38. A magnetic programming switch as in claim 2 and wherein:

(a) said element is slidably movable on said coil.

References Cited

UNITED STATES PATENTS

| | | | |
|---|---|---|---|
| 2,848,572 | 8/1958 | Wagnecz | 335—205 |
| 2,917,599 | 12/1959 | Ovshinsky | 335—1 |

BERNARD A. GILHEANY, *Primary Examiner.*

R. N. ENVALL, Jr., *Assistant Examiner.*

U.S. Cl. X.R.

335—206

UNITED STATES PATENT OFFICE
CERTIFICATE OF CORRECTION

Patent No. 3,447,109 Dated May 27, 1969

Inventor(s) Bernard Edward Shlesinger, Jr.

It is certified that error appears in the above-identified patent and that said Letters Patent are hereby corrected as shown below:

Column 1, line 33, "1,874,237" should read -- 2,874,237 --. Column 5, line 74, "magnet" should read -- magnetic --. Column 6, line 1, beginning with "means" cancel all to and including "circuitry." in line 5, same column 6, and insert -- means for contracting and expanding said member whereby, when said devices are electrically connected, movement of said member from one position to another moves said element from one position to another thereby to selectively operate certain of said electrical circuitry. --. Column 7, line 4, "magnetci" should read -- magnetic --.

Signed and sealed this 1st day of September 1970.

(SEAL)
Attest:

EDWARD M. FLETCHER, JR.
Attesting Officer

WILLIAM E. SCHUYLER, JR.
Commissioner of Patents

USCOMM-DC 60376-P69
★ U.S. GOVERNMENT PRINTING OFFICE : 1969 O-366-334